April 30, 1968     H. R. WAGNER     3,380,177
CRITICAL PATH AND PROJECT EVOLUTION REVIEW
PLANNING DEVICE Filed Aug. 25, 1965     3 Sheets-Sheet 1

INVENTOR,
HEINZ R. WAGNER
BY
ATTORNEYS

April 30, 1968　　　H. R. WAGNER　　　3,380,177
CRITICAL PATH AND PROJECT EVOLUTION REVIEW
PLANNING DEVICE
Filed Aug. 25, 1965　　　　　　　　　　　　　3 Sheets-Sheet 2

INVENTOR,
HEINZ R. WAGNER
BY *[signature]*
ATTORNEYS

United States Patent Office 3,380,177
Patented Apr. 30, 1968

3,380,177
CRITICAL PATH AND PROJECT EVOLUTION
REVIEW PLANNING DEVICE
Heinz R. Wagner, Zurich, Switzerland, assignor to Ruegg-Naegeli & Cie Aktiengesellschaft, Zurich, Switzerland, a corporation of Switzerland
Filed Aug. 25, 1965, Ser. No. 482,440
Claims priority, application Switzerland, Sept. 2, 1964, 11,440/64; June 21, 1965, 8,640/65
37 Claims. (Cl. 35—24)

ABSTRACT OF THE DISCLOSURE

A planning device for critical path techniques and the like wherein a plurality of holder members are selectively positionable and detachably secured to a base plate. Flexible elongated connecting elements are then attached between various desired holder members. Each holder member corresponds to one of several events which is desired to be represented, whereas the flexible elongated connecting elements between the holder members represent activities which are expected to happen between the events represented by the holder members. Accordingly, a method of planning is provided utilizing critical path and project evolution techniques.

---

The present invention has reference to an improved planning device for visually representing for example different projects, work schedules, programs, flow diagrams and so forth, and is particularly suitable for carrying out the so-called critical path techniques and project evolution review techniques. This invention also relates to an improved holder element or indicator for use with the inventive planning device.

The critical path techniques and project evolution review techniques constitute flexible planning aids, particularly for planning and controlling complicated operational procedures. A detailed discussion of such is presented in the article by M. Breu, appearing at volume 7, pp. 11–17 of the publication "Der Betriebsfachmann/L'agent d'exploitation 12," in which further literature is also cited. The plan for carrying out such critical path techniques and project evolution review techniques depicts in functional interrelationship all the necessary tasks for the performance of the operational procedure or method.

Previously a plan of the last-mentioned type was only illustrated by drafting. This technique was not only cumbersome, but above all possessed the disadvantage that subsequent additions of new tasks and events for reasons of space could oftentimes not be drafted into the old plan, so that it had to be completely re-drafted.

Accordingly, it is a primary object of the present invention which overcomes the disadvantage of having to depict plans of the mentioned type by drafting techniques.

A further, more specific object of this invention has reference to an improved planning device which enables plans to be easily visually represented as well as subsequently altered.

Another object of this invention concerns an improved construction of holder element for use with planning boards.

Still another considerable object of this invention is to provide an improved planning device for laying out plans of various types and which enables modification of an existing plan to be undertaken with a minimum of effort.

In order to implement these and still further objects of the present invention, the new and improved planning device can be selectviely detachably connected holder ele device incorporates a planning board or base plate to which there can be selectively detachably connected holder elements provided with for the separate receipt and/or attachment of a plurality of elongated connecting elements which interconnect desired holder elements with one another. The elongated connecting elements can possess a substantially filamentous structure, for instnace, can be formed from a flexible cord-like member or helical spring. Moreover, the attachment means of each holder element is constructed so that it is capable of simultaneously receiving a plurality of the elongated connecting elements. Furthermore, attachment of any given elongated connecting element between any two desired holder elements is effected such that this elongated connecting element is substantially disposed at the location of the connecting line extending between said two desired holder elements. It is here also mentioned that the holder elements will sometimes hereinafter be referred to as indicator elements or indicators.

Attachment of such indicators or holder elements to the planning board or base plate is possible for instance in that the latter is provided with a plurality of holes which advantageously are distributed in honeycomb fashion througout the entire surface of such base plate and the portion of each indicator confronting the base plate is provided with a pin-like projection or peg which fits into any of these holes. A further possibility for attachment is provided by forming at least a portion of the base plate from a ferromagnetic material in which case the holder elements are provided with holding magnets or equivalent structure at the side facing the base plate. According to a further embodiment of the invention the base plate can be covered or provided with a textile surface material, for instance fabric, and the indicators are then provided with a textile adhering material, for instance textile adhering strips having hook-shaped holding elements, at the side facing the covered textile surface of the base plate.

The invention contemplates that the means for the receipt and/or attachment of the elongated connecting elements to the indicators comprises recesses provided at each indicator, for instance in the form of diametrically extending slots. Advantageously, the holder element or indicator can be constructed in the form of a hollow body member e.g., hollow cylinder, closed at the end facing towards the base plate and open at its other end, wherein the mentioned recesses are arranged at the wall of such hollow body member. These receses can also be constructed in the form of a plurality of slots distributed about the circumference of the hollow body member and parallel to its axis, in the case of a cylindrical body member parallel to the axis of the cylinder. However, such attachment means could also possess a tooth-like configuration which would extend about the entire periphery of the cylindrical body member. Naturally, the body member can possess a configuration other than cylindrical.

Advantageously, the indicators or holder elements are provided with means which prevent undesired detachment of the elongated connecting element from the recesses in a direction perpendicular to the plane of the planning board or base plate. To this end, each indicator can be provided with a closure element or cover member for obturating the open end of the recesses. This closure member can be constructed as a downwardly flanged or rimmed cover whereby the rim engages with the outer surface of the body member, or also can be constructed in the form of a stopper. In the latter instance the stopper-like closure preferably possesses a plate-like upper portion formed of a material to which writing or markings can be applied, such plate-like upper portion extending at least to the peripheral surface of the relevant indicator and preferably somewhat past such.

It is also possible to prevent detachment of the elongated connecting elements from the recesses or slots by forming the same to possess a barb- or hook-shaped portion at their lower closed ends.

It is also possible to advantageously secure the elongated connecting elements against tension in lengthwise direction. For this purpose, they can be provided at their ends with thickened portions, even in the form of a knot, clamps or equivalents, which prevent their ends from slipping through the recesses. Moreover, to secure an elongated connecting element which has been threaded or pulled through an indicator, it is possible to construct the closure element for such indicator so that it clamps the elongated connecting element at the indicator, particularly towards its floor portion or towards the closed end of the recesses. In the same way, it is also possible to secure the ends of an elongated connecting element which starts at the relevant indicator.

Changeability of the length of the elongated connecting elements can be achieved by forming them from an elastic material, for instance rubber or a helical spring. However, they could also be formed of an inelastic material and spirally wound up internally of the hollow constructed indicator and can be pulled off, as required, against a spring tension active upon the wound-up connecting element. It is to be understood that elongated connecting elements formed in the manner explained above will sometimes hereinafter be conveniently designated cord-like or filament-like connecting elements.

The invention also contemplates providing flat labelling elements which are advantageously larger than the indicators or holder elements, and each of which can be mounted upon an indicator or simultaneously upon a plurality of indicators. To enable such, these labelling elements are advantageously provided with clamping springs at the side facing the base plate.

The layout of plans, especially for carrying out critical path techniques and project evolution review techniques, by means of the afore-described planning device is particularly manifested by its simplicity. The indicators are mounted to the planning board or base plate, the cord-like connecting elements inserted into the recesses of the indicators and, if desired, the closure element marked. When adding to the plan new tasks and events the needed space for doing so can be obtained by optionally displacing the indicators together with the therein suspended cord-like connecting elements at the base plate and are then again secured at the new location. In so doing, the depicted relationship between the various components of the planning device remains unchanged.

According to a further advantageous physical construction of the inventive planning device, each or a portion of the holder elements can be provided with a plurality of holding members mutually displaced about its circumference in such a manner that the cord-like connecting elements can be attached to such holding members by means of coupling elements applied to such connecting elements and cooperating with these holding members and/or by wrapping such connecting elements around the holding members.

Furthermore, with the embodiments of holder elements of the inventive planning device which are provided with recesses or slots or equivalent structure, it is possible to provide marking elements or riders insertable in the throughpassages of the holder elements or in the intermediate compartments or openings between neighboring holding members. These marking elements can serve to designate the different sections or portions of the connecting elements between the holder elements according to type and direction, for instance for designating the individual working steps of a complicated work procedure or method.

Other features, objects and advantages of the invention will become apparent by reference to the following detailed description and drawings in which.

Figure 16:
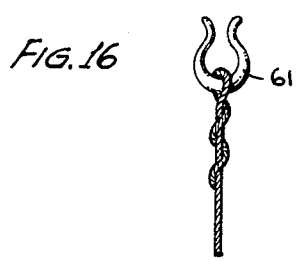
Figures 17, 18:
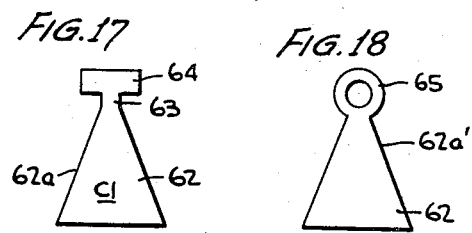

FIGURE 16 schematically depicts a spring-clamp means secured to the end of a connecting element;

FIGURE 17 schematically depicts a marking element which possesses an arrowhead and can be inserted in the various different holder elements;

FIGURE 18 illustrates a modified form of marking element; and

Figure 19:
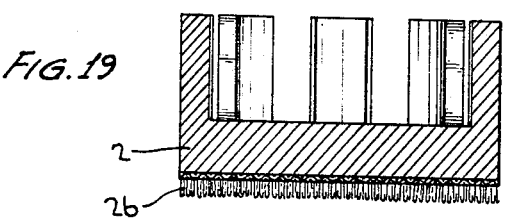

FIGURE 19 is a vertical cross-sectional view of a further embodiment of the holder element incorporating a textile adhering material.

Figure 1:
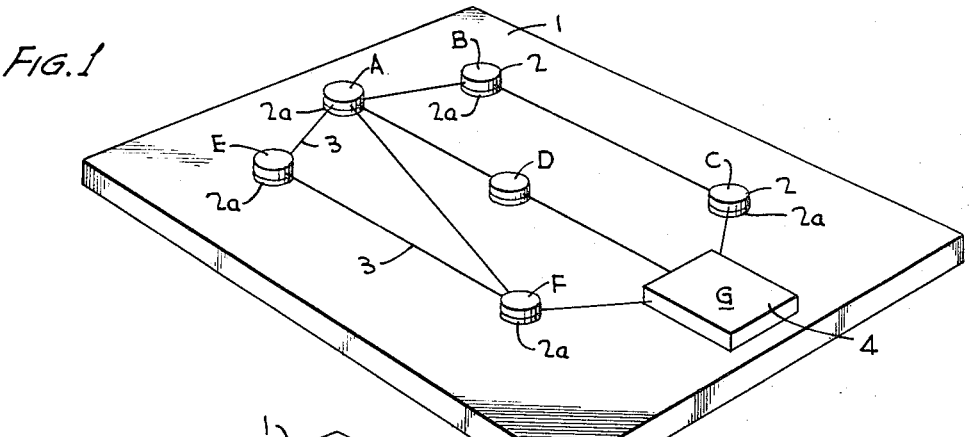
FIGURE 1 is a perspective view of an embodiment of inventive planning device depicting a relatively simple linked plan.
Figure 2:
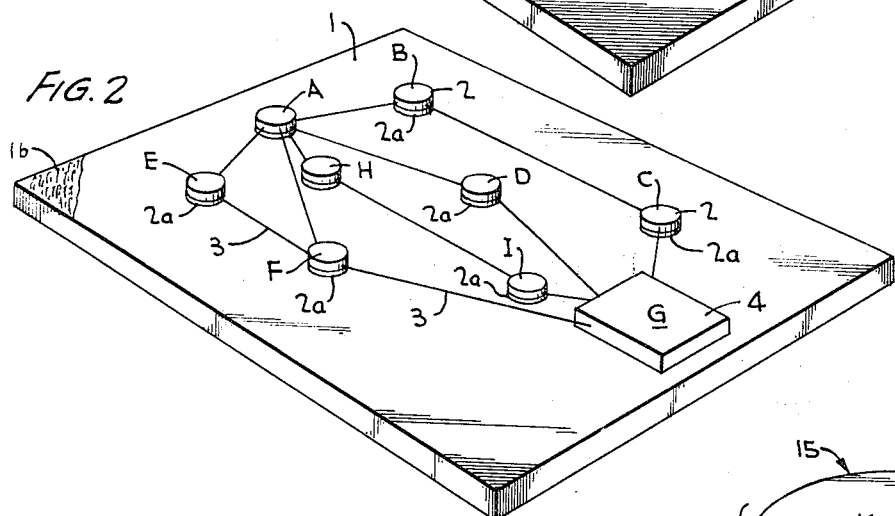
FIGURE 2 is a perspective view of the planning device illustrated in FIGURE 1, showing a plan modified from the plan depicted in the previous figure.

Describing now the drawings, and with attention initially directed to the embodiment of inventive planning device depicted in FIGURES 1 and 2, it will be seen that such incorporates a planning board or base plate 1 to which a number of holder elements or indicators 2 can be selectively and detachably mounted at any desired location at such base plate. In the exemplary embodiment it is to be assumed that this base plate 1 is formed of a ferromagnetic material and the holder elements 2 are provided at their ends confronting such base plate with holding magnets 2a. Naturally, the body of the holder element 2 could also be formed of a magnetic material. While this represents one possibility of attaching these holder elements, as to be explained shortly, they could also be provided with pins or pegs at their bottom end which would fit into holes of the base plate 1, such as the holes 45a of the base plate 45 shown in FIGURE 11. As also previously mentioned, the surface of the base plate 1 could be provided with a textile surface material 1b and the underface of the holder elements 2 with a textile adhering material 2b such as shown in FIGURE 19, thereby enabling the holder elements to be detachably secured to such base plate. It will also be recognized that elongated connecting elements 3, here shown to be of cord-like construction, are suspended at the holder elements 2 and a larger labelling element 4 is mounted at one of the holder elements.

In FIGURE 1 an operational procedure is depicted which encompasses the seven events A to G represented by the individual holder elements 2. The activities between these events A to G are represented by the cord-like connecting elements 3. Now, as shown in FIGURE 2, should the further events H and I be introduced into the plan, then space is initially provided by displacing the holder elements 2 representing the events D, E and F. In so doing, the depicted relationship is maintained.

Figure 3:
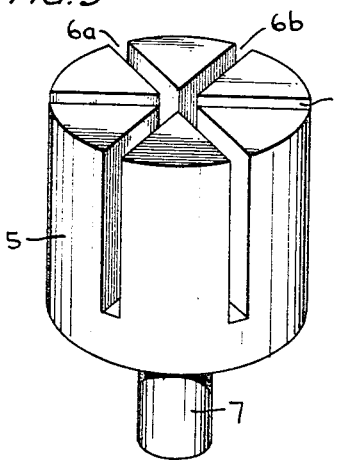
FIGURES 3 to 5 illustrate in perspective view three different embodiments of holder element or indicator designed according to the teaching of the invention.

In FIGURES 3 to 15 various forms of holder elements are depicted which are provided with pegs or pins for insertion in a planning board or base plate possessing a plurality of spaced peg-receiving holes. Specifically, turning attention now to the embodiment of holder element shown in FIGURE 3, such is a simple construction of holder element without securement of the elongated connecting element. It comprises a substantialy cylindrical body portion 5 having three diametrically extending slots 6a, 6b and 6c, and a pin-like projection or peg 7 which can be inserted in any desired hole of the base plate or planning board, such as base plate 1, assuming that the latter is provided with such holes.

Figure 4:
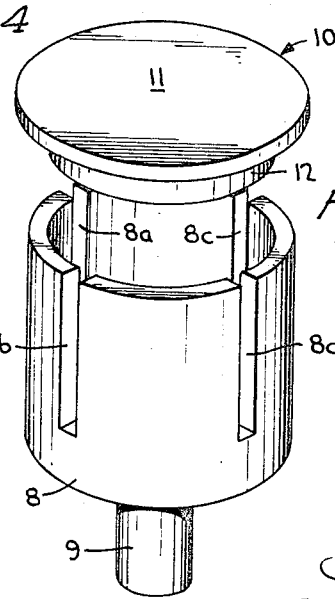

FIGURE 4 depicts a holder element or indicator having a body member or portion 8 formed as a hollow cylinder. The walls of this hollow cylindrical body portion 8 are provided with four linear slots or recesses 8a to 8d. Here again, this holder element includes a pin-like projection or peg 9 at its lower end which permits attachment to the planning board or base plate. In this case, the holder element is also provided with a closure element in the form of a cover member 10 having a plate-like upper portion 11 of flat construction formed of a material which can have markings applied thereto. Advantageously, this plate-like upper portion 11 extends somewhat past the peripheral surface of the hollow cylindrical body member or portion 8 in order that the cover member 10 can be easily grasped and removed. It will also be seen that the lower portion of cover member 10 has a downwardly depending shoulder or extension 12 which engages in stopper-like manner with the inner wall of the body member 8 and is resiliently retained by the latter.

Figure 5:
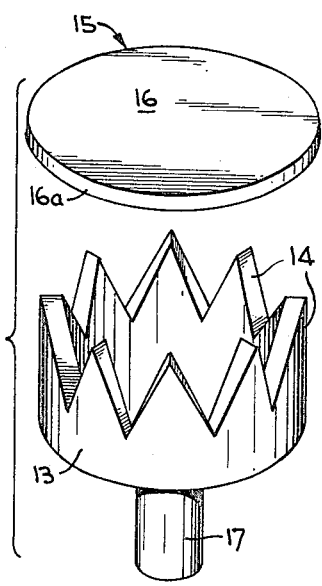

The holder element depicted in FIGURE 5 also incorporates a hollow body portion or member 13 which is likewise shown to be of substantially cylindrical configuration. However, in lieu of the plurality of separate slots or recesses 8a to 8d of the previous embodiment, here the open end of the cylindrical body portion 13 is provided with teeth 14 which extend completely around the circumference thereof. A cover member 15 is also provided which can have markings applied thereto, namely at its plate-like upper portion 16. In this instance, the cover member 15 has a downwardly depending rim 16a which engages about the outer circumference of the hollow body member or portion 13. As with the previous embodiments, this holder element is also equipped with a peg or pin-like projection 17 at its lower end.

Figure 6:
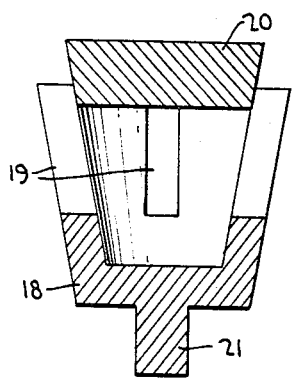
FIGURE 6 illustrates in vertical sectional view a further embodiment of inventive holder element or indicator.

The holder element of FIGURE 6 incorporates a body portion or member 18 constructed as a truncated cone having four linear slots or recesses 19 formed at the wall thereof. Closure of this holder element is effected by means of a likewise truncated cone-shaped stopper-like cover member 20. A peg or pin-like projection 21 is provided at the bottom end of this holder element for the reason already discussed.

Figure 7:
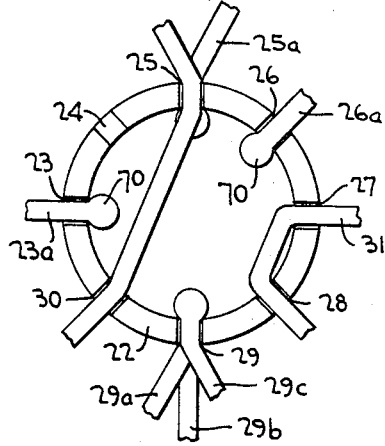
FIGURE 7 is a plan view showing the manner of guiding the elongated or cord-like connecting elements in an indicator.

FIGURE 7 schematically depicts innumerous possibilities for guiding the cord-like connecting elements at a holder element. In this case, such holder element or indicator 22 possesses eight slots or recesses 23 to 30 uniformly distributed about the circumference of the cylindrical walls. It can be seen that in the slots 23 and 26 a separate respective cord-like connecting element 23a and 26a is suspended. It is to be assumed that such connecting elements are formed of an elastic, rubber-like matrial, for instance natural or synthetic rubber, and provided at their ends with a spherical thickened portion 70 formed of the same material to prevent slipping out of the associated slots. This thickened portion 70 could also be provided by forming a knot at each end of the revelant connecting element. Instead of providing such spherical thickened portion 70, these connecting elements could be equipped with metal clamps or equivalent structure at their ends, further to be discussed hereinafter. The elastic connecting elements could also be braided with a strand of preferably colored textile material.

By further referring to FIGURE 7 it will be seen that three cord-like connecting elements 29a, 29b and 29c arranged in superimposed relation are suspended in the slot 29. A cord-like connecting element 31 is threaded through the slots 27 and 28, the ends of which are secured to two further indicators or holder elements. The cord-like connecting element 25a is suspended at the slot or recess 25. Lying on top of it is a further cord-like connecting element which is threaded through this slot 25 and also through the slot or recess 30. It should thus be apparent that there are manifold possibilities for attaching these connecting elements to the holder elements.

Figure 8:
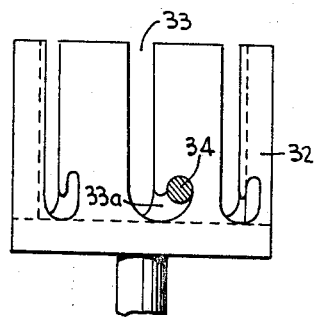
FIGURE 8 depicts in side view an indicator having specially configured slot-shaped recesses with hook-like ends.

The holder element or indicator of FIGURE 8 possesses a hollow body portion 32 provided with circumferentially distributed recesses or slots 33, the lower ends 33a of which are barb- or hook-shaped. The cord-like connecting element 34 is introduced into the bent lower portion 33a of a given slot 33 and is thereby secured from moving out of its holder element in a direction perpendicular to the plane of the base plate and without necessitating a cover member.

Figure 9:
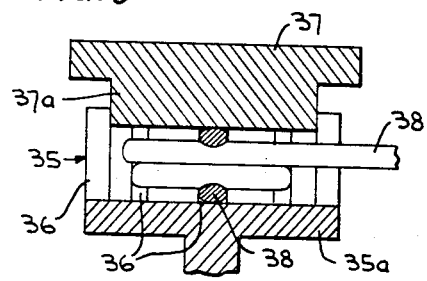
FIGURE 9 is a vertical cross-sectional view of an indicator or holder element provided with a cover constructed as a clamping element.

A holder element is depicted in FIGURE 9 which incorporates a hollow body portion 35 having eight slots or recesses 36 distributed about its circumference. Four cord-like connecting elements 38 are arranged in stacked fashion internally of this hollow body portion 35 and the cover member 37 is constructed so that it secures such connecting elements against tension in their lengthwise direction; such connecting elements not being provided with thickenings, clamps or the like at their ends. Specifically, the cover member 37 has a downwardly depending shoulder or flange 37a of sufficient length to enable clamping of these connecting elements within the hollow body portion 35. As shown, the clamping action can take place with respect to the floor 35a of the holder element, or in the event that the slots 36 do not extend up to such floor, with respect to the lower ends of such slots.

Figure 10:
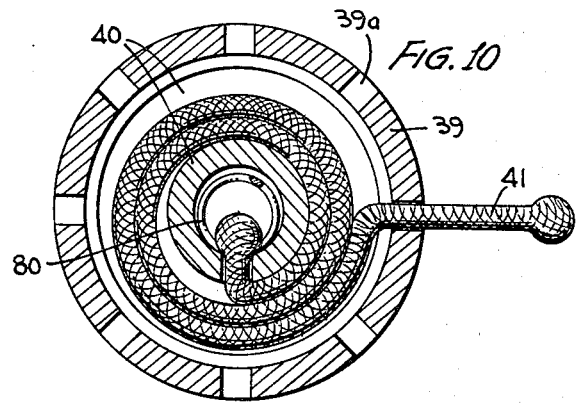
FIGURE 10 is a horizontal cross-sectional view of an indicator internally provided with a cord-like wound-up connecting element.

FIGURE 10 depicts a holder element which is constructed to simultaneously provide a supply container for one or a plurality of retractable cord-like elements which are formed of inelastic material. The hollow cylindrical body portion 39 of this holder element is provided at its wall with eight slots or recesses 39a and internally with a spool or core 40 onto which is wound the cord-like connecting element 41. This spool 40 is spring-biased in known manner in the wind-up direction. Specifically, at the lower end or internally of this core or spool 40 there is provided a spring element 80 which tends to rotate this spool so that the connecting element 41 is located thereon in wound-up condition. It will be understood that in the same holder element it is also possible to arrange a number of spools with the corresponding spring elements, either in stacked formation or next to one another in the same plane.

Figure 11:
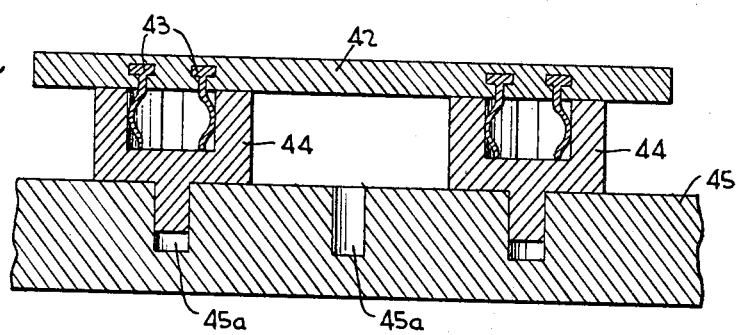
FIGURE 11 is a fragmentary, vertical sectional view depicting the mounting of a labelling element to a number of indicators seated upon a base plate or planning board provided with holes.

FIGURE 11 illustrates in cross-section the arrangement of a labelling element 42 which is larger than the individual holder elements 44. This plate-like labelling element 42 is provided at its underface with clamping springs 43 which can engage with the walls of the inner compartment of an associated holder element 44. The latter is inserted in the honeycomb distributed holes 45a of the planning board or base plate 45. The labelling element 42 is advantageously constructed so that it can be simultaneously mounted upon two, three or four holder elements 44. When doing such, the cord-like connecting elements, not visible in such figure, are first suspended and threaded in the usual manner through the holder elements 44 prior to mounting the labelling element 42.

Figure 12:
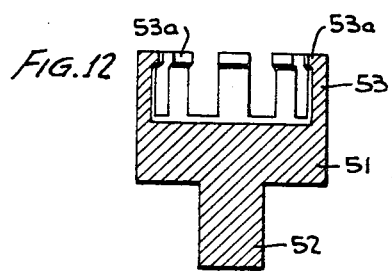
FIGURE 12 is a vertical cross-sectional view of a further embodiment of holder element.
Figure 13:
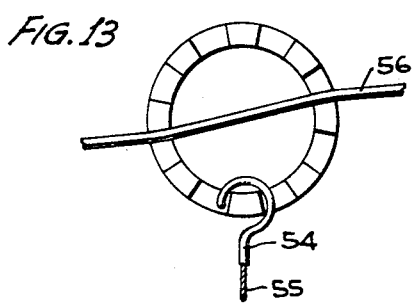
FIGURE 13 is a top plan view of the holder element of FIGURE 12 depicting a connecting element threaded through such holder element and a further connecting element attached by means of a hook to such holder element.

The holder element of FIGURE 12, for instance formed of plastic, embodies a disk-shaped body member or portion 51 having an integral cylindrical peg 52 at its lower end and at the upper end a rim of integral holding members providing holding claws 53. As explained, the peg 52 serves to mount the holder element in an optional hole of the base plate which is provided with a whole series of such holes. The holding claws 53 are internally reinforced at their upper ends, as indicated at 53a, in order to prevent an attachment or holding device inserted thereon from sliding off. FIGURE 13 shows such an attachment device in the form of a hook 54 which is secured to one end of a cord-like connecting element 55. Furthermore, this figure shows a connecting element 56 which is threaded through two neighboring holding claws 53, yet not fixed to such, so that it can practically move freely in lengthwise direction.

Figure 14:
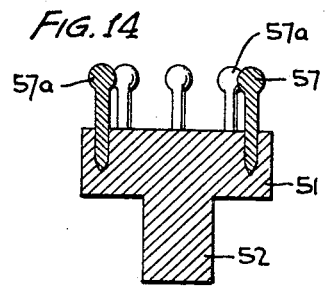
FIGURE 14 is a view similar to FIGURE 12 depicting a further embodiment of holder element.

FIGURE 14 depicts a different embodiment of holder element where the disk-shaped body portion 51 has upright pins 57 provided with reinforced heads 57a which are inserted in place of the holding claws 53 of FIGURE 12. By inspecting FIGURE 15, it will be seen that a connecting element 59, having an eyelet 58 fixed to one end, is secured to one of the upright pins 57. A further connecting element 60 is passed between the intermediate space of two neighboring pins 57 and by multiple wrapping around an oppositely situated pin is secured thereto.

The upper free end of the respective holder elements of FIGURE 12 to 15 can also be obturated by means of a non-illustrated closure member or cover, similar to that explained and shown in some of the previous figures. In such case, it would also be possible to dispense with reinforcing the upper end of the holding claws 53 or the holding pins 57, since the closure member itself would prevent the coupling elements 54 and 58 from becoming detached from the holding claws 53 and pins 57 respectively. It should be recognized that the holding claws 53 and the holding pins 57 extend substantially perpendicular to the surface of the non-illustrated perforated base plate when the corresponding holder elements are mounted thereat.

FIGURE 16 illustrates a coupling piece or element 61 formed to provide a spring-clamp and connected to the end of its associated connecting element. Such spring-clamp coupling element 61 can be used in place of the coupling members depicted in FIGURES 13 and 15.

FIGURE 17 illustrates a marking element or rider 62a in the form of a small plate formed of plastic for instance. This marking element 62a has a marking portion 62 in the form of an arrowhead, a small neck portion 63 and a head piece 64. When such marking element 62a is mounted to a given holder element, such as those shown in FIGURES 12 and 14, then the neck portion 63 is situated between two neighboring holding claws 53 (FIGURE 12) or holding pins 57 (FIGURE 14), the head piece 64 bears from the inside against such holding claws or pins, and the arrowhead marking portion 62 lying outside of the associated holder element and pointing towards such. These marking elements 62a can also be differently colored.

Moreover, these marking elements 62a, which belong to one and the same planning device, can be differently constructed in order to characterize different operations. They can also have applied thereto marking symbols, for instance words, letters or numbers, combinations of letters and numbers, or even pictorial or other symbols. The arrowhead marking portion 62 of FIGURE 17 is shown by way of example provided with the marking "C1."

Figure 15:
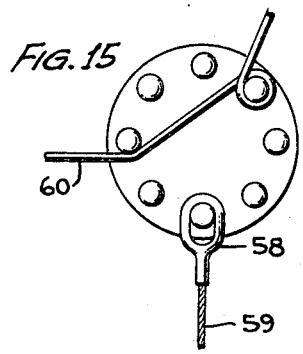
FIGURE 15 is a top plan view of the holder element of FIGURE 12 with a connecting element attached thereto by wrapping such around a holding member thereof and a further connecting element which is connected to a further holding member of such holder element by means of an eyelet.

A modified form of marking element 62a' is illustrated in FIGURE 18 where the head piece 65 is constructed as an eyelet in such a manner that this marking element can be mounted to one of the pins 57 of the holder element of FIGURES 14 and 15. Such a marking element 62a' advantageously serves to identify or characterize a connecting element, for instance the connecting element 59 of FIGURE 15 which is connected to one of the holding pins 57 by means of a coupling piece or element 58.

Carrying out the actual planning operation is directly possible by means of the previously described planning device. If the plan is required at a different location, for instance, it is simply possible to take a photograph of it.

While there is shown and described present preferred embodiments of the invention it is to be distinctly understood that the invention is not limited thereto but may be otherwise variously embodied and practised within the scope of the following claims.

What is claimed is:
1. A planning device for critical path techniques and the like which comprises:
  a base plate;
  a plurality of holder members selectively positionable upon said base plate and detachably securable thereto;
  flexible elongated connecting means for connecting at least two desired holder members one to another, said connecting means defining at least a portion of a critical path;
  each of said holder members being formed with a plurality of spaced gaps separated by elements which are generally perpendicular to said base plate when said holder member is secured to said base plate, said spaced gaps being adapted to receive and retain said flexible elongated connecting means.

2. A planning device as defined in claim 1 wherein said spaced gaps are arranged to enable suspending said connecting means between any two desired holder members and along a path substantially corresponding to a connecting line extending between said two desired holder members.

3. A planning device as defined in claim 2 wherein said flexible elongated connecting means are formed of elastic material.

4. A planning device as defined in claim 1 wherein said base plate is provided with a plurality of holes, each of said holder members incorporating a pin-like projection at the side facing said base plate and fitting into said holes to enable detachable connection of each holder means with said base plate.

5. A planning device as defined in claim 1 wherein said base plate is at least partially formed of a ferro-magnetic material, at least some of said holder members incorporating holding magnets at the side thereof facing said base plate to enable detachable connection of said holder members incorporating said holding magnets with said base plate.

6. A planning device for carrying out critical path techniques comprising a base plate, a plurality of holder elements detachably connectable with said base plate and selectively positionable thereon, elongated connecting means for interconnecting at least two desired holder elements with one another, said holder elements incorporating means for the separate receipt and attachment of a plurality of elongated connecting elements, and wherein at least a portion of said base plate is covered with a textile surface material, at least some of said holder members being provided with a textile adhering material capable of adhering to said textile surface material to enable detachable connection of said holder members provided with said textile adhering material to said textile surface material of said base plate.

7. A planning device as defined in claim 1 wherein each of said holder members comprises a hollow body member closed at one end facing said base plate and open at its opposite end, said hollow body member having a plurality of segmented wall portions, the spaces between said segments defining said spaced gaps for the receipt and attachment of said flexible elongated connecting means.

8. A planning device as defined in claim 1 wherein each of said holder members comprises a hollow body member closed at one end facing said base plate and open at its opposite end, said hollow body member having sawtooth shaped segmented wall portions provided at the region of said opposite end with teeth means extending about the entire periphery of said hollow body member.

9. A method of planning according to critical path and project evolution techniques which comprises:
  providing a separate holder member to correspond to each of several events which is desired to be represented;
  securing each said holder member to a base plate in a desired position relative to the other said holder members;
  providing elongated connecting elements to represent activities which are expected to happen between the represented events; and
  linking said holder members which represent specific events by means of said connecting elements representing activities expected to occur between said events.

10. A planning device as defined in claim 1 wherein said spaced gaps of said holder members define means for preventing unintentional release of said flexible elongated connecting means.

11. A planning device as defined in claim 1 wherein each of said holder members comprises a substantially hollow body member closed at one end facing said base plate and open at its opposite end, and a cover member provided for each holder member for closing said open end.

12. A planning device as defined in claim 11 wherein said cover member is provided with a downwardly extending rim engaging with the outer surface of said body member.

13. A planning device as defined in claim 11 wherein said cover member is provided with a downwardly projecting shoulder engageable with the inner walls of said substantially hollow body member to provide a stopper-like closure.

14. A planning device as defined in claim 11 wherein said cover member includes a plate-like upper portion which extends at least to the outer surface of said hollow body member.

15. A planning device as defined in claim 14 wherein said plate-like upper portion of said cover member extends laterally past said outer surface of said hollow body member.

16. A planning device as defined in claim 11 wherein said cover member incorporates means for urging said flexible elongated connecting means against a counter-support surface of the associated holder member to thereby fixedly yet detachably clamp said flexible elongated connecting means within said associated hollow body member.

17. A planning device as defined in claim 11 wherein said cover member has an upper surface formed of a material which is capable of having markings applied thereto.

18. A planning device as defined in claim 1 wherein each of said holder members comprises a hollow body member closed at one end facing said base plate and open at its opposite end, said hollow body member having segmented wall portions provided with a plurality of spaced recesses which are open at their respective end neighboring said open end of said hollow body member and are substantially hook-shaped at their opposite respective end neighboring said closed end of said hollow body member.

19. A planning device as defined in claim 1 wherein means are provided for said flexible elongated connecting means for positively retaining such at said holder members.

20. A planning device as defined in claim 19 wherein said retaining means comprises a thickened portion provided at at least one end of at least some of said flexible elongated connecting means.

21. A planning device as defined in claim 1 wherein some of said holder members comprise a hollow body member incorporating spring-loaded wind-up mechanism upon which is wound at least one flexible elongated connecting means.

22. A planning device as defined in claim 1 including at least one relatively flat labelling element capable of having markings applied thereto, said one flat labelling element including means which enables it to be simultaneously secured to a holder member.

23. A planning device as defined in claim 22 wherein said securing means is constructed to enable said labelling element to be simultaneously secured to a plurality of holder members.

24. A planning device as defined in claim 1 wherein said holder means comprise a plurality of holding elements displaced with respect to one another about the periphery of the associated holder member in such a manner that said holding element enables said flexible elongated connecting means to be detachably secured to the associated holder member.

25. A planning device as defined in claim 24 wherein said plurality of holding elements are provided at the region of their uppermost portion with claw means, said holding elements extending substantially perpendicular to said base plate.

26. A planning device as defined in claim 24 wherein said plurality of holding elements are constructed as individual pins extending substantially perpendicular to said base plate.

27. A planning device as defined in claim 24 wherein each of said holder members comprises a substantially disk-shaped body member provided with a projecting peg enabling attachment of said holder member to said base plate.

28. A planning device as defined in claim 25 wherein each of said holder members includes a substantially disk-shaped body member, said plurality of holding elements provided with claw means being integrally formed with said disk-shaped body member.

29. A planning device as defined in claim 26 wherein each of said holder members includes a substantially disk-shaped body member, said individual pins of each holder member being embedded in said disk-shaped body member.

30. A planning device as defined in claim 24 wherein each of said flexible elongated connecting means is provided with at least one coupling element engageable with the holding elements.

31. A planning device as defined in claim 30 wherein said coupling element is constructed in the form of a hook.

32. A planning device as defined in claim 30 wherein said coupling is constructed to provide eyelet means.

33. A planning device as defined in claim 30 wherein said coupling element is constructed to provide spring-clamp means.

34. A planning device as defined in claim 1 further including at least one marking element capable of being inserted in said spaced gaps for said flexible elongated connecting means.

35. A planning device as defined in claim 34 wherein said marking element includes a portion configured substantially in the form of an arrowhead and which extends outside of the associated holder member when connected therewith.

36. A planning device as defined in claim 34 wherein a plurality of said marking elements are provided each of which possesses a different color.

37. A planning device as defined in claim 34 wherein a plurality of said marking elements are provided each of which can be inscribed with a different marking.

References Cited

UNITED STATES PATENTS

| | | | |
|---|---|---|---|
| 2,545,409 | 3/1951 | McCall | 35—7 |
| 2,983,892 | 5/1961 | Williams et al. | 35—19.1 |
| 3,028,686 | 4/1962 | Frisch | 35—34 |
| 3,083,475 | 4/1963 | Lepondre | 35—34 |
| 3,124,885 | 3/1964 | Mendell | 35—24.2 |
| 3,139,687 | 7/1964 | Hamer | 35—7 |
| 3,277,589 | 10/1966 | Berdan et al. | 35—7 |
| 3,290,797 | 12/1966 | Opel | 35—24.2 |

FOREIGN PATENTS 907,744  10/1962  Great Britain.

EUGENE R. CAPOZIO, *Primary Examiner.*

WILLIAM H. GRIEB, *Examiner.*